US012789195B2

(12) United States Patent
Hachenberg

(10) Patent No.: US 12,789,195 B2
(45) Date of Patent: Nov. 10, 2026

(54) HIGH-PRESSURE ROLLER MILL HAVING VIBRATING LATERAL WALLS

(71) Applicant: KHD HUMBOLDT WEDAG GMBH, Cologne (DE)

(72) Inventor: Niko Hachenberg, Overath (DE)

(73) Assignee: KHD Humboldt Wedag GmbH, Cologne (DE)

(*) Notice: Subject to any disclaimer, the term of this patent is extended or adjusted under 35 U.S.C. 154(b) by 271 days.

(21) Appl. No.: 18/546,724

(22) PCT Filed: Feb. 17, 2022

(86) PCT No.: PCT/EP2022/053909
§ 371 (c)(1),
(2) Date: Aug. 16, 2023

(87) PCT Pub. No.: WO2022/175372
PCT Pub. Date: Aug. 25, 2022

(65) Prior Publication Data

US 2024/0131524 A1 Apr. 25, 2024
US 2024/0226908 A9 Jul. 11, 2024

(30) Foreign Application Priority Data

Feb. 18, 2021 (DE) ..................... 10 2021 103 889.3

(51) Int. Cl.
*B02C 4/42* (2006.01)
*B02C 4/02* (2006.01)
(Continued)

(52) U.S. Cl.
CPC ................ *B02C 4/423* (2013.01); *B02C 4/02* (2013.01); *B02C 4/283* (2013.01); *B02C 4/32* (2013.01)

(58) Field of Classification Search
CPC ................................ B02C 4/423; B02C 4/283
See application file for complete search history.

(56) References Cited

U.S. PATENT DOCUMENTS 2,808,215 A * 10/1957 Bosshard ................ B02C 4/283 241/226
4,357,287 A 11/1982 Schoenert
(Continued)

FOREIGN PATENT DOCUMENTS

CN 111266292 A * 6/2020 ............... B07B 1/46
DE 2708053 A1 9/1978
(Continued)

OTHER PUBLICATIONS

English translate (WO2009083005A1), retrieved date Jul. 10, 2025.*
(Continued)

*Primary Examiner* — Mohammed S. Alawadi
(74) *Attorney, Agent, or Firm* — Greer, Burns & Crain, Ltd.

(57) ABSTRACT

A high-pressure roller mill for comminuting brittle grinding stock having at least two adjacent rotating grinding rollers which rotate in opposite directions and form a nip therebetween, wherein a first grinding roller is a fixed roller and a second grinding roller is an idle roller, and a lateral wall at each of the two ends of the nip. Each lateral wall has a vibration device which sets the lateral wall into mechanical vibration.

8 Claims, 2 Drawing Sheets

(51) Int. Cl.

| | |
|---|---|
| ***B02C 4/28*** | (2006.01) |
| ***B02C 4/32*** | (2006.01) |
| ***B30B 3/04*** | (2006.01) |

(56) References Cited

U.S. PATENT DOCUMENTS

| | | | |
|---|---|---|---|
| 9,498,779 | B2 | 11/2016 | Brendler et al. |
| 2014/0048634 | A1 | 2/2014 | Brendler et al. |

FOREIGN PATENT DOCUMENTS

| | | | | | |
|---|---|---|---|---|---|
| DE | 202009014079 | U1 | * | 12/2009 | ............. B02C 4/286 |
| DE | 102011018705 | A1 | | 10/2012 | |
| DE | 202012012460 | U1 | | 1/2013 | |
| DE | 102014100199 | B3 | * | 2/2015 | ............... B30B 3/04 |
| DE | 102019120469 | A1 | | 2/2021 | |
| WO | WO-2009083005 | A1 | * | 7/2009 | ............. B02C 4/423 |

OTHER PUBLICATIONS

English translate (DE202009014079U1), retrieved date Jul. 10, 2025.*
English translate (DE102014100199B3), retrieved date Feb. 16, 2026.*
English translate (CN111266292A), retrieved date Feb. 16, 2026.*
International Search Report for corresponding International Patent Application No. PCT/EP2022/053909 dated Jul. 19, 2022.

* cited by examiner

HIGH-PRESSURE ROLLER MILL HAVING VIBRATING LATERAL WALLS

CROSS-REFERENCES TO RELATED APPLICATIONS

This application is a national phase of International Patent Application No. PCT/EP2021/084560, filed on Dec. 7, 2021, which claims the benefit of German Patent Application No. 10 2020 133 103.8, filed on Dec. 10, 2020, the entire disclosures of which are incorporated herein by way of reference.

FIELD OF THE INVENTION

The invention relates to a high-pressure roller press for comminuting brittle material for grinding, comprising at least two grinding rollers, which are next to one another, rotate in opposite directions, and form a roller gap between them, wherein a first grinding roller is a fixed roller and a second grinding roller is a floating roller, and a respective lateral wall at the two ends of the roller gap.

BACKGROUND OF THE INVENTION

To comminute or compact brittle, granular material for grinding, such as ores and rock, use is frequently made of high-pressure roller presses consisting of two rotatably mounted press rollers, which are next to one another, run in opposite directions, are generally the same size, revolve at the same circumferential speed and form a narrow roller gap between them. The material for grinding that is to be comminuted or compacted is drawn through this roller gap, wherein the material for grinding is comminuted or compacted under the high pressure prevailing in the roller gap. The result of this treatment, specifically comminution or compression, largely depends on the material properties of the material for grinding that is to be comminuted. The comminution described here in the roller gap, without shearing and also without impact, was first described by Schönert et al. in the German laid-open specification DE 27 08 053 A1 as high-pressure comminution and ever since it has been considered a generic type of comminution, alongside grinding by shearing, and crushing.

High-pressure roller presses for comminuting granular material according to Schönert fundamentally differ from other presses which are used to comminute other materials. In particular, high-pressure roller presses, which are intended for comminution of rock, are not comparable with roller presses for instance for comminution of grain. In grain rollers, grain is pulverized. Grain rollers have weights in the region of at most 100 kg. The overall equipment setup for a grain roller differs very greatly from high-pressure roller presses. In addition, grain rollers operate with shearing action. By contrast, high-pressure roller presses operate without shearing. This means that the two grinding rollers have exactly the same surface speed in the roller gap and, when running, do not slip against one another.

High-pressure roller presses also differ considerably from strip rollers for rolling steel. Steel strip rollers are distinguished by their use-induced smooth running. The steel between the strip rollers is either very ductile because the steel to be rolled is hot-formed, or the steel can be cold-formed. Consequently, a steel roller runs really quite smoothly owing to the nature of the rolling method. It is therefore possible to operate a strip roller with two rollers placed horizontally one above the other, wherein the roller gap pressure can be generated by the inherent weight of the rollers and also by hydraulic auxiliary means. The steel to be rolled passes through the roller gap of a strip roller in the horizontal direction, that is to say perpendicularly to the gravitational force, which presses the upper grinding roller onto the strip steel. Depending on the steel to be rolled, strip rollers reach a roller gap speed of up to 200 km/h. Steel strip rolling can be readily compared with a cake dough roller, which rolls over raw pizza dough and in the process spreads the pizza dough, although the forces acting in a steel strip roller are many orders of magnitude greater. By contrast, high-pressure roller presses for comminuting ores and rock generally have rollers which are horizontally next to one another and have a passage in the vertical direction for the material for grinding. In the process, the roller gap speeds in high-pressure roller presses for comminuting ores and rock reach speeds at most in the lower double-digit km/h range.

Strip rollers for steel thus operate at a different operating extreme to high-pressure roller presses. Strip rollers run quickly and uniformly and deform ductile steel, which deforms under the roller. High-pressure roller presses run slowly, and in the roller gap the material for grinding spontaneously and suddenly escapes the pressure in the roller gap because it is brittle. In high-pressure roller presses, the rollers are horizontally next to one another and form a roller gap in which the material for grinding runs through vertically. High-pressure roller presses have a roller gap pressure of 50 MPa and more. As a result of the horizontal arrangement of the rollers next to one another and of operating with brittle material, the mechanical behavior as a whole of the high-pressure roller press cannot be compared with the mechanical behavior of strip rollers that are vertically one above the other and furthermore exhibit damped and uniform running owing to the ductility of the steel to be rolled.

If air permeates the material for grinding in a high-pressure roller press unevenly, as it passes through the roller gap the material for grinding is offered the option of escaping into the air gap and thus escaping the high pressure in the roller gap, as a result of which the comminution performance of the high-pressure roller press is considerably reduced. Furthermore, as a result the high-pressure roller press can be caused to run non-uniformly, in that the rollers perform rotary oscillation, because the drive of the high-pressure roller press rollers is braked and runs freely again repeatedly. This abrupt change in loading continues throughout the high-pressure roller press and can be observed as a vibration of the entire high-pressure roller press. In unfavorable conditions, the vibration can continue into the foundation and under unfavorable circumstances even damage the foundation.

In order to apply material for grinding uniformly to the roller gap for uniform and smooth running of the high-pressure roller press, devices for feeding material for grinding into such a high-pressure roller press that vary the inflow of the material for grinding in regulated fashion so that a constant cone of bulk material forms in the space between the two oppositely running rollers are known. Depending on the type and consistency of the material for grinding, this type of application of material to the roller gap is, however, not sufficient to ensure vibration-free running of the high-pressure roller press rollers and to achieve continuous operation of the entire comminuting machine as high-pressure roller press. A non-uniform grain distribution in the material for grinding and air pockets in the loose fill cannot always satisfactorily be compensated solely by regulating the cone of bulk material in the space between the oppositely running rollers.

The German utility model DE 20 2009 014 079 U1 proposes putting vibration rods, for instance as are known from concrete casting technology as concrete vibrators, in the feeding device that reach up to the compaction zone of the material for grinding that is to be comminuted. The vibration rods ventilate the material for grinding by fluidizing it and thus ensure more uniform running. During actual operation, it has been found that the vibration rods do not cope with the harsh conditions in the high-pressure roller press. The vibration rods become worn or even bent by the material for grinding too quickly. The service life of concrete vibrators or metal bars which are made to vibrate using the concrete vibrator is not sufficient to ensure sufficiently lengthy operation without stopping the high-pressure roller press.

In order for the surface of the rollers of high-pressure roller presses to be able to operate up to the maximum load and thus maximize the grinding efficiency, it is very important to be able to reliably rule out overload of the surface of the grinding rollers in the form of an excessively high roller gap pressure. Otherwise, that is to say in the event of operation in the overload range, the surface material of the grinding rollers can break away, in the event of which the surface finish is lost at the points where material breakaway has occurred. Owing to material of the surface of a grinding roller breaking away, it is no longer possible to operate the high-pressure roller press uniformly. As a result of material of the surface breaking away, the grinding roller necessarily switches over to percussive operation, because the roller gap pressure abruptly drops when the surface where material breakaway has occurred passes through the roller gap and abruptly rises again when the points on the surface where material breakaway has occurred leave the roller gap again.

For optimum operation of a high-pressure roller press, it is important that the pressure in the roller gap as far as possible does not vary over time. To that end, the German laid-open specification DE 10 2011 018 705 A1 teaches regulating the hydraulics that maintain the pressure in the roller gap in accordance with the vibration of the high-pressure roller press. This regulation leads to smooth and uniform running of the high-pressure roller press.

The present invention is concerned with pressure distribution along the roller gap from the center of the roller gap to the two ends of the roller gap. Since the roller gap is open on both sides, a flowing movement of the material for grinding takes place in the material for grinding along the compaction zone, which starts slightly above the roller gap and runs into the roller gap. This flowing movement results in a material flow from the center of the roller gap to the two ends of the roller gap. Since the material for grinding can flow out of the roller gap at the roller gap ends, the material for grinding follows the pressure drop in the gap and thus escapes compression.

The unwanted pressure drop described above from the center of the roller gap to the two ends also cannot be completely eliminated by having a feeding device charge the roller gap uniformly from above. As a result of this pressure drop, the pressure in the center of the roller gap is greater. As a result, the floating roller in the high-pressure roller press tends to perform an oscillating movement about a vertical axis about the pressure point in the center of the roller gap, the oscillation frequency being 0.1 Hz or lower. The roller gap thereby temporarily does not always have the same width, but is shaped like a cone, with the largest roller gap pressure being in the center of the grinding roller. The grinding roller thus suffers from wear during lengthy operation which turns the shape of the cylindrical grinding roller into a tapered shape. A grinding roller deformed in this way cannot be used further.

SUMMARY OF THE INVENTION

It is therefore an object of the invention to make the pressure distribution along the roller gap more uniform.

The object according to the invention is achieved in that the respective lateral wall has a vibration device which makes the lateral wall mechanically oscillate. Further advantageous configurations are specified in the claims that are dependent on claim 1.

According to the concept of the invention, the intention is to use a vibration device to make the lateral walls of the high-pressure roller press that close the roller gap mechanically oscillate. The mechanical oscillations fluidize the material for grinding and thus facilitate passage through the gap, with the result that the roller gap pressure is increased steadily in the region of the roller gap ends. Since the roller gap pressure is a quotient of the pressing surface, that is to say the height of the compaction zone above the roller gap, and the product of the height of the actual compaction zone times the length of the roller gap, the roller gap pressure drops in the center of the roller gap and rises at the ends of the roller gap. Consequently, the roller gap pressure is homogenized over the length of the roller gap. The result of this pressure homogenization is that the floating roller does not wobble, that is to say does not perform a rotary oscillation by fractions of an angular degree about a vertical axis. Without this wobbling movement, the high-pressure roller press operates with consistent efficiency over a lengthy period of time. The wear pattern of the grinding rollers is also homogenized, with the result that no great tapering of the grinding rollers owing to wear forms.

Advantageously, the input of energy by the vibration device into the material for grinding is dimensioned such that the vibration device operates with a frequency between 10 Hz and 150 Hz, preferably operates with a frequency between 10 Hz and 60 Hz, and introduces an input of energy between 0.1 kJ/m$^3$ and 10 kJ/m 3, preferably between 0.1 kJ/m$^3$ and 1.0 kJ/m$^3$, into the material for grinding. The dimensioning necessary for this can be determined by simple experimental measurement. The input of energy depends on the exact geometry of the lateral wall, which exhibits a wave pattern individual to the present geometry when it vibrates. The wave pattern in turn is responsible for the locations at which energy is input into the material for grinding. The simple experiment requires the measurement of the current consumption and the mass flow, which can be ascertained by weighing the material for grinding that has passed through.

During operation, it has been found that this gives an optimum input of energy. As a result, it can advantageously be provided that the vibration device has or is connected to a regulating device, which regulates the vibration intensity in accordance with the energy it consumed for operation, wherein an increased energy consumption results in a reduction in the vibration intensity and a reduced energy consumption results in an increase in the vibration intensity. This regulation strategy avoids the lateral wall interfering excessively with the grinding behavior and in the process itself being damaged.

The regulation strategy can also comprise regulation in accordance with the energy consumption of the roller drive.

It may thus be provided that the regulating device additionally or alternatively performs regulation in accordance with the energy consumption of a roller drive, wherein an increased energy consumption of the roller drive results in a reduction in the vibration intensity and a reduced energy consumption results in an increase in the vibration intensity. This regulation strategy takes into account the fact that, when a fluidization effect is forming in the material for grinding, the average pressure in the roller gap rises and requires a high drive power of the grinding rollers. Operation with high drive power is, however, not necessarily the most energy-efficient drive.

Lastly, it is possible to perform another additional or alternative regulation. It may be provided that the vibration device is additionally regulated in accordance with the gap width of the roller gap, wherein a larger gap width results in an increase in the vibration intensity and a smaller gap width results in a reduction in the vibration intensity. This regulation strategy takes into account the observable effect that the roller gap widens when the roller gap overflows. Fluidization of the material for grinding assists with elimination of the temporary overflow effect.

Yet another additional or alternative regulation strategy can comprise the vibration device being additionally regulated in accordance with the tendency of the floating roller to rotate about a vertical axis, wherein the vibration intensity is increased as the rotary oscillation frequency of the floating roller rises, and vice versa. This regulation strategy comprises the avoidance of a wobbling movement of the floating roller by fractions of an angular degree, wherein the wobbling takes place with a frequency of less than 0.1 Hz. This regulation strategy comprises rather slow changes to parameters with a longer setting time than is the case for the previous regulation strategies. To measure the wobbling movement, position sensors can be used at the bearing points, the position sensors measuring the relative distance between the two roller axes at both ends of the rollers and storing it in memory over a lengthy period of time in the range of 1 min to 10 min for a statistical analysis of the wobbling movement.

It is also possible to impulsively use the vibration device. To that end, it may be provided that a manual triggering device, like a button, for the vibration device is provided. To that end, an operator operates the triggering device when an overflow in the roller gap is established.

BRIEF DESCRIPTION OF THE DRAWINGS

The invention will be explained in more detail on the basis of the following figures, in which.

DETAILED DESCRIPTION OF THE PREFERRED EMBODIMENTS

Figure 1:
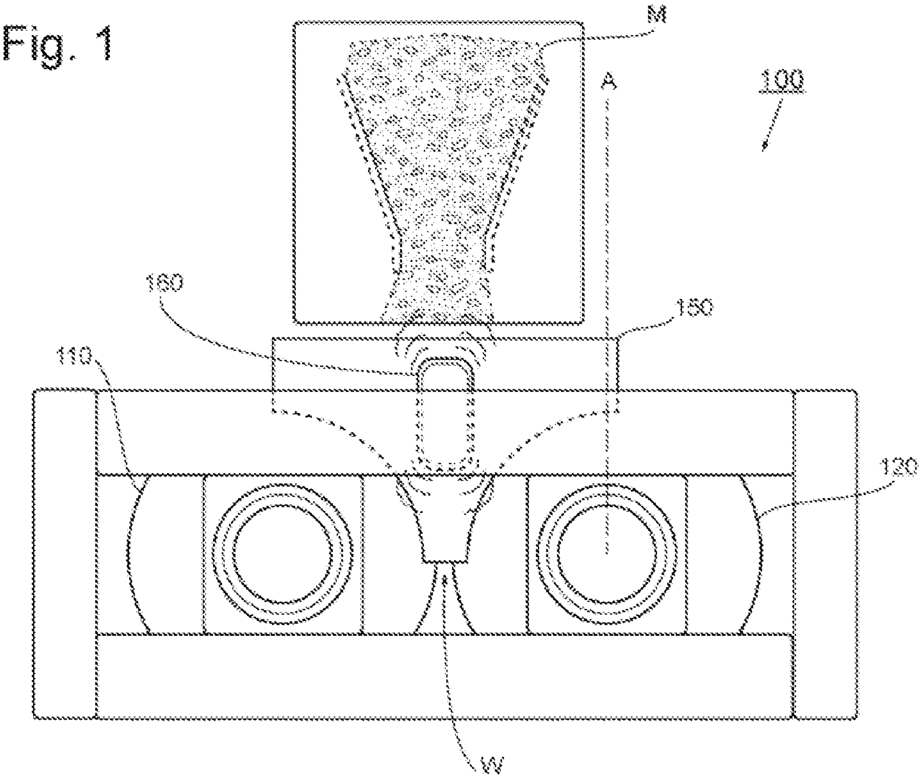
FIG. 1 shows a sketch of a high-pressure roller press according to the invention in a side view.

FIG. 1 shows a diagram of a high-pressure roller press 100 according to the invention in a side view. The high-pressure roller press 100 according to the invention for comminuting brittle material for grinding M has at least two grinding rollers 110, 120, which are next to one another and rotate in opposite directions. The two grinding rollers 110, 120 form a roller gap W between them, through which the material for grinding M is drawn without, or with only very little, relative slippage of the grinding rollers 110, 120. A first grinding roller (110) is a fixed roller and a second grinding roller 120 is a floating roller. The floating roller 120 has two degrees of freedom of movement. It can be removed from the fixed roller 110 with widening of the roller gap W and also rotated about the vertical axis A by fractions of an angular degree. In order to avoid the material for grinding M flowing to the opening, which is in the plane of the drawing, of the roller gap W and falling out there, a lateral wall 150, 150' is provided at both openings of the roller gap W. According to the concept of the invention, a respective lateral wall has a vibration device, like a hydraulic plunger, which makes the respective lateral wall 150, 150' mechanically oscillate. This mechanical oscillation is transferred to the material for grinding M, which is located close to the respective end of the roller gap W and flows on or in the compaction zone. This oscillation fluidizes the material for grinding M and thereby assists it in passing through the roller gap W, in which a pressure of 50 MPa or higher prevails.

Figure 2:
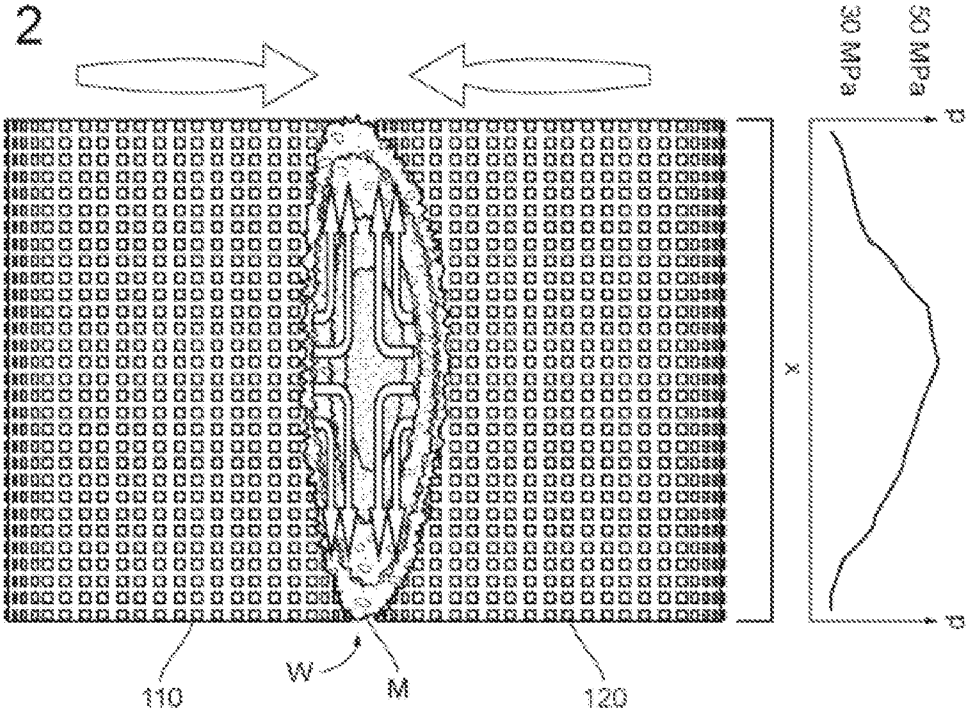
FIG. 2 shows a plan view of a roller gap, covered with material for grinding, of a high-pressure roller press without lateral walls, here in a view of the grinding rollers.

FIG. 2 shows a plan view of a roller gap W, covered with material for grinding M, of a high-pressure roller press 100 without lateral walls 150, 150', in this instance in a view onto the grinding rollers 110, 120. The material for grinding M settles on the roller gap W as loose fill and covers the roller gap W. Arrows are depicted on the material for grinding M which show the approximate flow movement of the material for grinding M on the roller gap W into the region of the compaction zone. The actual movement of a particle of material for grinding does not necessarily amount to the length of the arrow, but may also be only a fraction thereof along the path of the arrow. A diagram is shown on the right next to the sketch in FIG. 2, the diagram illustrating the possible pressure p in the roller gap W as position x along the roller gap W. In this open high-pressure roller press, the pressure drop in the roller gap W toward the ends is very great, and therefore the pressure in the roller gap W drops considerably in the region of the roller ends by up to 50 MPa. As a result of this, there is no longer efficient comminution by compaction in the region of the roller gap ends.

Figure 3:
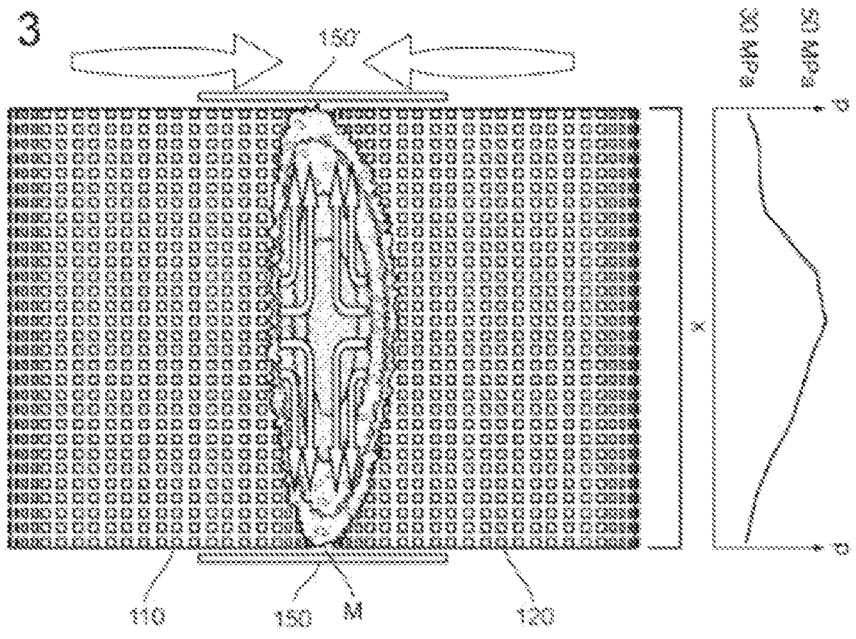
FIG. 3 shows a plan view of a roller gap, covered with material for grinding, of a high-pressure roller press with lateral walls from the PRIOR ART.

FIG. 3 shows a plan view of a roller gap W, covered with material for grinding M, of a high-pressure roller press 100 with static lateral walls 150, 150', in this instance in a view onto the grinding rollers 110, 120. The pressure drop in the roller gap W to the roller shoulder, that is to say in the region of an end of the roller gap, is considerably reduced in relation to the arrangement in FIG. 1, but is still present. This effect is referred to as "peripheral zone effect". This effect is partially caused by the friction at the lateral wall. The lateral wall forms a flow barrier and the resulting friction rises as the pressing pressure increases, since the counterpressure at the lateral wall surface rises. The more strongly the material is pressed out of the gap against the lateral wall, the greater the coefficient of friction becomes and thus less material flows into the peripheral zone of the gap. Consequently, the compression of the material bed and thus the resulting pressure in the peripheral zone are correspondingly reduced. The result of this is rather a somewhat bell-shaped pressure distribution along the roller gap.

Figure 4:
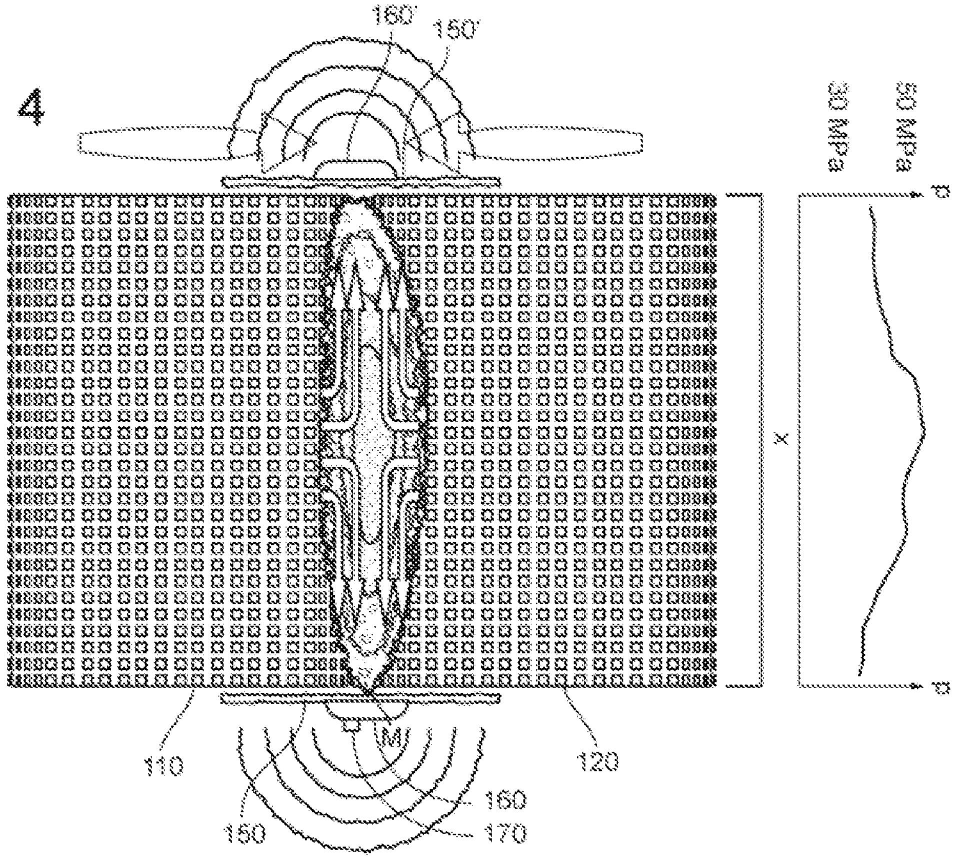
PRIOR ART Fig. 4
FIG. 4 shows a plan view of a roller gap, covered with material for grinding, of a high-pressure roller press according to the invention.

FIG. 4 shows a plan view of a roller gap W, covered with material for grinding M, of a high-pressure roller press 100 according to the invention with vibrating lateral walls 150, 150', in this instance in a view onto the grinding rollers 110, 120. In this case, the vibration is generated by a vibration device 160, the intensity of which is optionally regulated by a regulating device 170, like a damper. The respective vibrating lateral wall (150, 150') maintains the pressure at the ends of the roller gap W, since the material for grinding M can flow into the roller gap W unobstructed. The vibration assists the material for grinding M in passing through the roller gap. The unobstructed material flow along the entire roller width ensures a uniform pressure profile and uniform wear of the grinding rollers 110 and 120, with the result that no considerable tapering forms.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

100 High-pressure roller press
110 Grinding roller
120 Grinding roller
150 Lateral wall
150' Lateral wall
160 Vibration device
160' Vibration device
170 Regulating device
A Axis
M Material for grinding
W Roller gap

The invention claimed is:

1. A high-pressure roller press for comminuting brittle material for grinding, the high-pressure roller press comprising:

at least two grinding rollers arranged next to one another and configured to rotate in opposite directions and form a roller gap between them, wherein a first grinding roller of the at least two grinding rollers is a fixed roller and a second grinding roller of the at least two grinding rollers is a floating roller, and a respective lateral wall at two ends of the roller gap, wherein the respective lateral wall has a vibration device which makes the respective lateral wall mechanically oscillate with a vibration frequency between 10 Hz and 150 Hz and to introduce mechanical energy into the brittle material for grinding within the roller gap.

2. The high-pressure roller press as claimed in claim 1, wherein the vibration device introduces an input of energy between 0.1 $kJ/m^3$ and 10 $kJ/m^3$ into the material for grinding (M).

3. The high-pressure roller press as claimed in claim 1, wherein the vibration device has a regulating device configured to regulate a vibration intensity in accordance with an energy consumed by the vibration device for operation, wherein an increased energy consumption results in a reduction of the vibration intensity and a reduced energy consumption results in an increase in the vibration intensity.

4. The high-pressure roller press as claimed in claim 3, wherein the regulating device is further configured to perform regulation in accordance with an energy consumption of a roller drive, wherein an increased energy consumption of the roller drive results in the reduction in the vibration intensity and a reduced energy consumption results in the increase in the vibration intensity.

5. The high-pressure roller press as claimed in claim 3, wherein the vibration device is further configured to be regulated in accordance with a width of the roller gap, wherein a larger gap width results in the increase in the vibration intensity and a smaller gap width results in the reduction in the vibration intensity.

6. The high-pressure roller press as claimed in claim 3, wherein the vibration device is further configured to be regulated in accordance with a tendency of the floating roller to rotate about a vertical axis (A), wherein the vibration intensity is increased as a rotary oscillation frequency of the floating roller increases, and the vibration intensity is decreased as the rotary oscillation frequency of the floating roller decreases.

7. The high-pressure roller press as claimed in claim 1, further comprising:

a manual triggering device for the vibration device.

8. A high-pressure roller press for comminuting brittle material for grinding under a roller gap pressure of at least 50 MPa, the high-pressure roller press comprising:

at least two grinding rollers arranged horizontally next to one another and configured to rotate in opposite directions and to form a roller gap between them, wherein a first grinding roller of the at least two grinding rollers is a fixed roller and a second grinding roller of the at least two grinding rollers is a floating roller; and a respective lateral wall at two ends of the roller gap, the respective lateral wall delimiting a high-pressure zone above the roller gap, wherein the respective lateral wall has a vibration device mounted on the respective lateral wall and configured to make the respective lateral wall mechanically oscillate with a vibration frequency between 10 Hz and 150 Hz and to introduce mechanical energy into the brittle material for grinding within the roller gap, thereby fluidizing the brittle material at the ends of the roller gap.

* * * * *